United States Patent
Fry et al.

(10) Patent No.: US 6,399,741 B1
(45) Date of Patent: Jun. 4, 2002

(54) COLOR-STABLE POLYALKYLENEIMINE DERIVATIVES, FIBERGLASS LUBRICANTS CONTAINING THE SAME AND PROCESSES FOR PRODUCING THE SAME

(75) Inventors: Douglas F. Fry, Charlotte, NC (US); Frank Norman Tuller, Simpsonville, SC (US)

(73) Assignee: Cognis Corporation, Gulph Mills, PA (US)

( * ) Notice: Subject to any disclaimer, the term of this patent is extended or adjusted under 35 U.S.C. 154(b) by 0 days.

(21) Appl. No.: 09/804,377

(22) Filed: Mar. 12, 2001

Related U.S. Application Data

(60) Provisional application No. 60/188,896, filed on Mar. 13, 2000.

(51) Int. Cl.$^7$ .................. C08G 69/08; C08G 69/26; C08G 69/34; D02G 3/00; D06M 13/00
(52) U.S. Cl. .................. 528/310; 528/329.1; 528/332; 528/335; 528/336; 528/339; 528/339.3; 524/538; 524/600; 524/606; 524/800; 524/802; 252/400.5; 428/357; 428/364; 428/378; 428/394; 428/395; 8/115.51; 8/115.6
(58) Field of Search .............................. 528/310, 329.1, 528/332, 335, 336, 339, 339.3; 524/538, 600, 606, 800, 802; 428/357, 364, 378, 394, 395; 8/115.51, 115.6; 252/400.5

(56) References Cited

U.S. PATENT DOCUMENTS

| | | | | |
|---|---|---|---|---|
| 3,234,025 A | * | 2/1966 | Van Hoof et al. | ............... 96/95 |
| 3,597,265 A | * | 8/1971 | Mecklenborg et al. | ..... 8/115.51 |
| 3,617,440 A | | 11/1971 | Strother, Jr. | |
| 4,255,317 A | | 3/1981 | Coakley et al. | ............. 428/391 |
| 4,631,226 A | | 12/1986 | Jellinek | ....................... 428/270 |
| 5,646,207 A | | 7/1997 | Schell | ......................... 524/47 |
| 5,665,470 A | * | 9/1997 | Kay et al. | .................... 428/378 |
| 6,228,281 B1 | * | 5/2001 | Sage | ......................... 252/8.83 |

* cited by examiner

Primary Examiner—P. Hampton-Hightower
(74) Attorney, Agent, or Firm—John E. Drach; Aaron R. Ettelman

(57) ABSTRACT

Polymer derivatives based upon polyalkyleneimine backbones having a color stabilizing-effective amount of their reactive amino functionalities substituted by either a carboxylic acid or an amino-protecting group such as urea, are disclosed. Methods for preparing said derivatives are also disclosed. Fiber lubricant compositions comprising said polymer derivatives, and the resistance to yellowing associated with such lubricants are disclosed. Also disclosed are methods for treating fibers using the polymer derivatives.

42 Claims, No Drawings

COLOR-STABLE POLYALKYLENEIMINE DERIVATIVES, FIBERGLASS LUBRICANTS CONTAINING THE SAME AND PROCESSES FOR PRODUCING THE SAME

CROSS-REFERENCE TO RELATED APPLICATIONS

This application claims benefit of priority, under 35 U.S.C. §119(e), of U.S. Provisional Patent Application No. 60/188,896, filed Mar. 13, 2000, the entire contents of which are herein incorporated by reference.

BACKGROUND OF THE INVENTION

Fiber processing, including, for example, the manufacture of continuous strands from numerous monofilaments or individual fibers, usually involves the use of equipment which subjects the monofilaments, individual fibers and/or continuous strands to high speed, wherein the fiber materials are subjected to destructive abrasive forces which can be the result of both mutual abrasion between strands and/or between the strands and the equipment. At any rate, it is usual to provide some lubrication for the fibers. Fiber lubricants are commonly used during the production of many different materials, including fiberglass and synthetic fibers such as polyesters, polyolefins, polyacrylics, polyamides, etc. Fiber lubricants are typically applied to fibers as a component of a sizing composition, usually immediately after fiber formation, but before fibers are gathered into a bundle, and may also added to fiber materials to provide lubricity during subsequent usage.

One class of fiber lubricants is polyethyleneimine polyamides. Polyethyleneimine polyamides are commonly used to lubricate fiberglass. Polyethyleneimine polyamides generally provide adequate lubricity in that filaments breaking, i.e., fuzz formation is limited during processing and fiber tensile strength is generally improved. However, in some processing applications where the treated material is exposed to heat, air and the combination thereof, the polyethyleneimine polyamides may become discolored, evidenced by a yellowing of the material.

One method for combating the unattractive yellowing that occurs during such processing of fibers such as fiberglass which have been treated with sizing compositions including polyethyleneimine polyamide lubricants, and/or other compounds associated with yellowing, is to add a fluorescent whitening agent to the sizing composition prior to use. Fluorescent whitening agents can be expensive, and may be problematic in terms of formulation, stability, solubility, etc.

Discoloration will not necessarily render the fiber material unusable, but for aesthetic reasons, discoloration should be avoided. Thus, there is a need in the art for a fiberglass lubricant with the lubricating properties of polyethyleneimine polyamides which possesses color stability when exposed to heat and/or air.

BRIEF SUMMARY OF THE INVENTION

The present invention relates to a polymer derivative, and more particularly, to a polyalkyleneimine polyamide-derivative which can be used as a fiber lubricant. Polymer derivatives in accordance with the present invention are particularly suitable as lubricants for fiberglass processing. Polymer derivatives in accordance with the present invention, and lubricant and sizing compositions containing such polymer derivatives, exhibit excellent color stability (i.e., reduced yellowing) when exposed to heat and/or air during or subsequent to fiber processing, as compared to commercially available polyalkyleneimine polyamide fiber lubricants.

One aspect of the present invention includes a polymer derivative which comprises a polyalkyleneimine backbone which has a number of reactive amino functionalities, each reactive amino functionality having at least one reactive hydrogen atom, wherein a color stabilizing-effective amount of the number of reactive amino functionalities have a substituent-compound independently selected from carboxylic acids and amine-protecting compounds substituted in place of a reactive hydrogen atom, and wherein at least about 20% of the substituent-compounds are selected from the group consisting of carboxylic acids. In preferred embodiments of this and other aspects of the present invention, the polyalkyleneimine backbone is a polyethyleneimine having a molecular weight of from about 1000 to about 1800 and the amine-protecting compound comprises urea.

Another aspect of the present invention includes a polymer derivative prepared by a process which comprises reacting a polyalkyleneimine having a number of reactive amino functionalities with a carboxylic acid and an amine-protecting compound, under conditions which are sufficient to derivatize a color stabilizing-effective amount of the reactive amino functionalities with either the carboxylic acid or the amine-protecting compound, wherein at least about 20% of the reactive amino functionalities are derivatized with the carboxylic acid.

Yet another aspect of the present invention includes a process for preparing a polymer derivative wherein the process comprises: (a) providing a polyalkyleneimine having a number of reactive amino functionalities per mole; (b) reacting the polyalkyleneimine with at least one carboxylic acid and an amine-protecting compound, wherein a total molar amount of the at least one carboxylic acid and the amine-protecting compound is used which is sufficient to derivatize a color stabilizing-effective amount of the number of reactive amino functionalities per mole of polyalkyleneimine. In some preferred embodiments of this and other aspects of the present invention, a polyethyleneimine having a molecular weight of about 1200 is reacted with acetic acid, pelargonic acid and urea, wherein a total molar amount of the acetic acid, pelargonic acid and urea is substantially equal to the number of reactive amino functionalities per mole of polyethyleneimine. The present invention also includes polymer derivatives prepared by processes in accordance with this aspect of the invention.

Other aspects of the present invention include fiber lubricant compositions and sizing compositions comprising one or more polymer derivatives according to any one of the aspects or embodiments of the present invention.

The present invention also includes a method of lubricating a fiber material comprising providing a fiber material and contacting the fiber material with a polymer derivative according to any one of the aspects or embodiments of the present invention.

As used herein, the terms "react", "substitute", and "derivatize", and their various tenses, all synonymously refer to a chemical reaction between a substituent-compound (i.e., a carboxylic acid or an amine-protecting compound) and a reactive amino functionality of a polyalkyleneimine.

DETAILED DESCRIPTION OF THE INVENTION

Polyalkyleneimines useful in accordance with the present invention include any polyalkyleneimines having reactive amino functionalities suitable for reaction with, for example, a carboxylic acid, such as, for example, the polyalkyleneimines described in U.S. Pat. No. 3,597,265, the entire contents of which are incorporated herein by reference, including mixtures of two or more different polyalkyleneimines. As used herein, the phrase "reactive amino functionality" shall refer to any primary or secondary nitrogen atom in a polyalkyleneimine. Also, as used herein, the terms "polyalkyleneimine backbone" and "polyethyleneimine backbone" refer to that portion of the resulting polymer derivative in accordance with the present invention which is derived from the original polyalkyleneimine or polyethyleneimine starting material, respectively.

The polyalkyleneimine, or the polyalkyleneimine backbone (which terms when referring to molecular weight are used synonymously), will preferably have a molecular weight of from about 300 to about 70000, and more preferably from about 400 to about 2500. Thus, when referring to the molecular weight of the polyalkyleneimine backbone of a polymer derivative in accordance with the present invention, such weights include reactive hydrogen atoms removed from the original polyalkyleneimine starting material upon substitution with a carboxylic acid or amine-protecting compound. Particularly preferred polyalkyleneimines are polyethyleneimines. Preferred polyethyleneimines will have a molecular weight of from about 1000 to about 1800, with molecular weights of about 1200 being most preferred at least in part due to commercial availability and economics.

Polyalkyleneimines, and particularly polyethyleneimines, can be commercially obtained from a wide range of sources including, for example, Aceto Corp. (Nippon Shokubai, Japan) and BASF. However, synthetic production of such polyalkyleneimines can be accomplished by known polymerization methods such as, for example, acid catalyzed polymerization of applicable monomers, including but not limited to, ethyleneimine (aziridine) and substituted aziridines.

The number of reactive amino functionalities per mole that any particular polyalkyleneimine will have is a function of its molecular weight, and may further vary slightly at any one particular molecular weight. For example, a polyethyleneimine with a molecular weight of about 1200 will have about 28 or 29 total amino functionalities per mole of that polyethyleneimine. However, from about 7 to about 9 of the total number of amino functionalities are likely to be tertiary. Thus, the number of reactive amino groups in a mole of a polyethyleneimine with a molecular weight of about 1200 can vary from about 20 to 21, and may vary more. Standard and well-known analytical methods, such as, for example, $C^{13}$ NMR, can assist in a determination of the number of reactive amino functionalities per mole of a particular polyalkyleneimine, if unknown.

Carboxylic acids useful in accordance with the present invention preferably have from about 2 to about 26 carbon atoms, including fatty acids (i.e., $C_6$–$C_{22}$), preferably from about 2 to about 18 carbon atoms, and most preferably from about 2 to about 9 carbon atoms. Carboxylic acids useful in accordance with the present invention may be linear or branched, and saturated or unsaturated. However, saturated acids are preferred as unsaturated acids may be more likely to yellow upon oxidation.

In certain preferred embodiments of the present invention, mixtures of two or more carboxylic acids are used. Accordingly, for example, two or more carboxylic acids having from about 2 to about 26 carbon atoms, or preferably from about 2 to about 18 carbon atoms, and most preferably from about 2 to about 9 carbon atoms, along with an amine-protecting compound, could be reacted with a polyalkyleneimine.

Mixtures of carboxylic acids include, but are not limited to, naturally occurring mixtures of fatty acids such as those obtained from palm or coconut oils, often referred to as technical mixtures. Such technical mixtures may contain several different chain length acids, such as a mixture having two or more acids of from 5 to 10 carbons atoms in length, or two or more acids having chain lengths of from 12 to 20 carbon atoms. A particularly preferred mixture of two or more carboxylic acids comprises pelargonic acid and acetic acid. The acids used in accordance with the present invention can be obtained commercially or obtained from natural sources by distillation. Non-naturally occurring fatty acids having an odd number of carbon atoms can also be obtained commercially or by known synthetic processes, such as via the oxidation of nonyl alcohol in the case of pelargonic acid. Acetic acid, or other short chain acids, may be used in conjunction with a longer fatty acid to impart water-solubility to the resulting polymer derivative.

Amine-protecting compounds useful in accordance with the present invention are capable of reacting with primary and secondary amine functionalities with sufficient favorability (thermodynamic, kinetic or otherwise) to substitute reactive amino functionalities present in a polyalkyleneimine, that are not otherwise substituted by the carboxylic acid(s) used in accordance with the present invention, such that a color stabilizing-effective amount of the number of reactive amino functionalities in the polyalkyleneimine backbone are substituted (i.e., reacted with or derivatized by, either a carboxylic acid or an amine-protecting compound). In general, in accordance with the present invention, a "color stabilizing-effective amount", means an amount which is at least about 60–65% of the total number of reactive amino functionalities present in a given polyalkyleneimine backbone. In preferred embodiments of the present invention, at least about 75% of the number of reactive amino functionalities in the polyalkyleneimine backbone are substituted. In increasingly more preferred embodiments of the present invention, at least about 80%, and at least about 90% of the number of reactive amino functionalities in the polyalkyleneimine backbone are substituted. Even more preferably, an amine-protecting compound used in accordance with the present invention will react with the reactive amino functionalities of the polyalkyleneimine with sufficient favorability, such that at least about 92% of the number of reactive amino functionalities in the polyalkyleneimine backbone are substituted, and in the most preferred embodiments of the present invention, at least about 94% of the number of reactive amino functionalities will be substituted.

Amine-protecting compounds useful in accordance with preferred embodiments of the present invention include, but are not limited to, urea and substituted ureas according to the general formula (I), isocyanates, cyanamides and substituted cyanamides, haloformates, azidoformates, sulfonyl halides, carbonates, dicarbonates, and methylating agents:

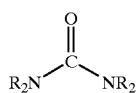

(I)

wherein each R independently represents a hydrogen atom, or an alkyl or aryl group having up to 30 carbon atoms. Urea compounds useful in accordance with the present invention include unsubstituted urea ($CO(NH_2)_2$), N-substituted, N,N'-substituted, N,N-substituted, N',N'-substituted, and N,N,N',N'-substituted ureas. Any substituent which does not interfere with the reaction between the urea carbonyl group and the remaining reactive amino functionalities in a polyalkyleneimine can be present, including, for example, alkyl substituents having from 1 to 30 carbon atoms, which may be linear or branched, and cyclic or acyclic.

Some compounds within the broad classes of compounds set forth above may not react with sufficient favorability to be considered a preferred amine-protecting compound, or even adequate. For example, dimethyl carbonate fails to provide a polymer derivative having at least about 90% of its reactive amino functionalities substituted in accordance with the present invention. However, other more reactive amine-protecting compounds may be effective, but could be considered too costly, such as in the case of some more reactive carbonates, or too toxic, such as with dimethyl sulfate. Preferred amine-protecting compounds include, but are not limited to, urea and substituted ureas according to the general formula (I), isocyanates, cyanamides and substituted cyanamides. More preferred amine-protecting compounds include, but are not limited to, urea and substituted ureas according to the general formula (I), wherein each R independently represents a hydrogen atom, or an aliphatic hydrocarbon group having up to 9 carbon atoms, and even more preferably no more than 3 carbon atoms. The most preferred amine-protecting compound is unsubstituted urea ("urea"), in part due to its low price.

Isocyanates useful as amine-protecting compounds include monofunctional isocyanates, such as, for example, ethyl isocyanate, octyl isocyanate and phenyl isocyanate to name a few. Cyanamide and substituted cyanamides, including mono- and di-substituted cyanamides wherein the substituents are selected from alkyl or aryl groups having up to 30 carbon atoms can be used as well.

As discussed above, polymer derivatives in accordance with the present invention comprise polyalkyleneimine backbones with a color stabilizing-effective amount of the number of reactive amino functionalities in the backbone substituted by either a carboxylic acid or an amine-protecting compound. Processes in accordance with the present invention, aiming to provide polymer derivatives satisfying such substituent criteria will preferably react a polyalkyleneimine with one or more carboxylic acids and at least one amine-protecting compound in accordance with the quantities described below.

Processes for preparing polymer derivatives in accordance with the present invention generally react a polyalkyleneimine with at least one carboxylic acid and an amine-protecting compound, wherein a total molar amount of the at least one carboxylic acid and the amine-protecting compound is used which is sufficient to derivatize a color stabilizing-effective amount of the number of reactive amino functionalities per mole. The total molar amount of the at least one carboxylic acid and the amine-protecting compound which is sufficient is generally equivalent to the number of reactive amino functionalities to be substituted. For example, approximately 22 to 23 moles of total carboxylic acid and amine-protecting compound would be reacted with a polyalkyleneimine backbone having 30 reactive amino functionalities per mole, to produce a polymer derivative having at least about 75% of the reactive amino functionalities substituted.

The carboxylic acid(s) and the amine-protecting compound(s) are generally reacted with the polyalkyleneimine in an acid:protectant molar ratio of from about 1:4 to about 4:1. A more preferred acid:protectant molar ratio of from about 2:3 to about 3:2. Even more preferably, an acid:protectant molar ratio of from about 1:1 to about 1.2:1 is employed.

When a mixture of carboxylic acids is used, the mole ratio of acids may be adjusted in any necessary manner to provide for increased lubrication, or increased water solubility, etc. For example, when acetic acid and pelargonic acid are used together, a preferred molar ratio of pelargonic acid to acetic acid is from about 9:1 to 1:9, with about 2:3 being more preferred.

The polymer derivatives in accordance with the present invention can be prepared by reacting a polyalkyleneimine with a carboxylic acid(s) and an amine-protecting compound (s), either sequentially or simultaneously. The polymer derivatives are preferably prepared by heating a polyalkyleneimine to a temperature of from about 30° C. to about 100° C., and more preferably from about 50 to about 60° C., and slowly adding appropriate amounts of one or more carboxylic acids. The mixture of the polyalkyleneimine and the one or more carboxylic acids is then heated and held at a temperature of from about 160° C. to about 220° C., preferably from about 180° C. to about 200° C., until no more substantial amounts of distillate are produced. This reaction is preferably allowed to proceed as close to completion as possible. The resulting partially amidated polyalkyleneimine is then cooled to a temperature of from about 100° C. to about 140° C., preferably lower than about 120° C., and most preferably to about 100° C. When using an amine-protecting compound such as a urea or a cyanamide, processing can preferably be assisted by adding water to the partially amidated polyalkyleneimine. An appropriate amount of an amine-protecting compound is then added, and the temperature is elevated, preferably slowly, up to about 140° C., and maintained at the slightly elevated temperature until the reaction is essentially complete, for example, in the case of urea, when the production of ammonia diminishes, and preferably for several hours. For example, the reaction is preferably allowed to proceed for at least about 3 to 4 hours. Water, preferably deionized water, may be added to dilute the resulting polymer derivative. The derivative, or optionally diluted derivative, is transferred to a suitable container. Some degree of dilution is preferred where the neat polymer derivative may be difficult to handle, such as in the case of a glass composition.

Fiber lubricant and sizing compositions in accordance with the present invention may be prepared by suitable dilution of a polymer derivative in accordance with the present invention with a solvent, preferably water. Such compositions may also include additional optional ingredients, such as antioxidants. Antioxidants which may be included can be of any variety, such as those described in U.S. Pat. No. 5,646,207, the entire contents of which are incorporated herein by reference, including sodium hypophosphite which is preferred. An antioxidant, such as sodium hypophosphite can be added to a fiber lubricant composition in accordance with the present invention in an amount of up to about 20% by weight, based on the solids content, and preferably about 10% by weight.

Fiber lubricants in accordance with the present invention provide excellent lubricity while maintaining excellent color-stability at elevated temperatures. The tendency of polyethyleneimine polyamides to yellow at elevated temperatures in air (approximately 100° C. or more) is significantly reduced in lubricant compositions according to the present invention. Thus, the present invention also provides a method of lubricating fiberglass materials in which yellowing upon exposure of the materials to heat is reduced.

The method of the present invention includes providing a fiber material and a fiber lubricant composition or sizing composition according to the present invention, and contacting the material with the composition. Excess lubricant or sizing composition may be drained, and the material dried. The material may be brought into contact with a lubricant or sizing composition by any known method, including for example, immersion, spraying, kiss-roll and brushing. Drying can be accomplished by placing the fiberglass material in an oven. Heating times and temperatures can be adjusted depending on the oven or heat source used.

The present invention will now be illustrated in more detail by reference to the following specific, non-limiting examples.

EXAMPLE 1

Approximately 0.250 moles of Epomin® SP-012, a polyethyleneimine with a molecular weight of about 1200 (Aceto Corp., Lake Success, N.Y.; Nippon Shakabi, Japan) were reacted with approximately 1.08 moles of Emery® 1203 pelargonic acid (Cognis Corp., Cincinnati Ohio) and approximately 1.48 moles of glacial acetic acid. The mixture was heated to 190° C. and held there for about 2 hours. The resulting polyethyleneimine polyamide was allowed to cool to about 100° C.

About 60 grams of deionized water and approximately 2.36 moles of urea were combined with the cooled polyethyleneimine polyamide, and the mixture was slowly heated to 130° C. and then held at that temperature for about 3.5 hours. The resulting yellow foam was then cooled to 100° C.

Deionized water, heated to about 50° C. and in an amount sufficient to make a 50% aqueous solution, was combined with the polyethyleneimine polyamide derivative and stirred until solution was complete.

A 5% (solids) solution of the product was prepared, and its pH adjusted to 5–6 using glacial acetic acid. A square of unsized, heat-cleaned fiberglass fabric was dipped into the solution and removed. Excess solution was allowed to drain from the fabric and the fabric was then placed in an air-draft oven at 130° C. for 1 hour to produce a fiberglass fabric square treated with a lubricant in accordance with one embodiment of the present invention.

The degree of yellowing of the treated fiberglass fabric square was evaluated, both quantitatively and subjectively, as follows. The whiteness, or absence of yellowing, of the fabric square was measured quantitatively via two standard methods. The first method of evaluation used was the standard method according to ASTM E313-00 "Standard practice for Calculating Yellowness and Whiteness Indices from Instrumentally Measured Color Coordinates", using an X-Rite® Model 978 spectrophotometer. The results set forth in Table 1 are identified as "We". ASTM E313 procedures and guidelines can be obtained from the American Society for Testing and Materials, (West Conshohocken, Pa., www.astm.org), and the entire contents of ASTM E313-00 are hereby incorporated herein by reference. The second method of evaluation used was the standard method according to CIE Publication No. 15.2, using an X-Rite® Model 978 spectrophotometer. The results set forth in Table 1 are identified as "W". CIE Publication No. 15.2 procedures and guidelines can be obtained from the International Commission on Illumination, (Vienna, Austria, www..cie.co.at), and the entire contents of CIE Publication No. 15.2 are hereby incorporated herein by reference. Finally subjective evaluation was performed via visual inspection and qualified as either white or yellow in accordance with the noticeability of any significant yellowing. An evaluation of "white" indicates that no significant visible yellowing was observed.

EXAMPLE 2

A polyethyleneimine polyamide prepared in accordance with Example 1 was derivatized with ethyl isocyanate (~2.36 moles) at 100–120° C. for 1 hour, and the resulting polyethyleneimine polyamide derivative was diluted with deionized water to make a 40% solution. A 5% (solids) solution of the product was prepared and made acidic (pH 5–6) with glacial acetic acid. An identical square of heat-cleaned, unsized fiberglass fabric, as was used in Example 1, was immersed in the solution and subjected to the identical drying treatment as in Example 1. Whiteness measurements of the fabric square treated in accordance with this example were conducted in accordance with the analytical procedures set forth above in Example 1. The results are set forth below in Table 1.

EXAMPLE 3

A polyethyleneimine polyamide prepared in accordance with Example 1 was diluted with about 250 grams of deionized water, then treated with glacial acetic acid (~2.64 moles) and a 23% solution of cyanamide (~2.64 moles) at 100° C. The mixture was heated to reflux for about 4.5 hours, then cooled to room temperature, to give a 54% solution of a polyethyleneimine polyamide guanidinium acetate derivative. A 5% (solids) solution of the product was prepared (pH 5–6). An identical square of heat-cleaned, unsized fiberglass fabric, as was used in Example 1, was immersed in the solution and subjected to the identical drying treatment as in Example 1. Whiteness measurements of the fabric square treated in accordance with this example were conducted in accordance with the analytical procedures referenced above in Example 1. The results are set forth below in Table 1.

Control Example

An identical square of heat-cleaned, unsized fiberglass fabric, not subjected to any treatment with a lubricant was evaluated in terms of whiteness, in accordance with the analytical procedures referenced above in Example 1. The results are set forth below in Table 1.

Comparative Example 1

A polyethyleneimine polyamide prepared in accordance with Example 1 was derivatized with dimethyl carbonate (~3.26 moles), and the mixture refluxed for 1 hour. The volatiles were removed by distillation, and the resulting polyethyleneimine polyamide partial carbamate derivative was diluted with deionized water to make a 44% solution. A 5% (solids) solution of the product was prepared and made acidic (pH 5–6) with glacial acetic acid. An identical square of heat-cleaned, unsized fiberglass fabric, as was used in Example 1, was immersed in the solution and subjected to the identical drying treatment as in Example 1. Whiteness measurements of the fabric square treated in accordance with this example were conducted in accordance with the analytical procedures referenced above in Example 1. The results are set forth below in Table 1.

Comparative Example 2

A polyethyleneimine polyamide prepared in accordance with Example 1 was diluted with deionized water to approximately 50% solids, cooled to 50° C., and acrylonitrile (~2.40 moles) was added drop-wise. The mixture was held at ~50° C. for about 3 hours, then was cooled to room temperature. The resulting partially-cyanoethylated polyethyleneimine polyamide was diluted with deionized water to make a 5% solids solution which was made acidic (pH 5–6) with glacial acetic acid. An identical square of heat-cleaned, unsized fiberglass fabric, as was used in Example 1, was immersed in the solution and subjected to the identical drying treatment as in Example 1. Whiteness measurements of the fabric square treated in accordance with this example were conducted in accordance with the analytical procedures referenced above in Example 1. The results are set forth below in Table 1.

Comparative Example 3

A polyethyleneimine polyamide prepared in accordance with Example 1 was diluted with deionized water to approximately 50% solids, cooled to 41° C., and formic acid (~3.96 moles) was added, followed by paraformaldehyde (~1.26 moles). The mixture was heated at 40–60° C. for about 7 hours, then cooled to room temperature. The resulting partially-N-methylated polyethyleneimine polyamide was diluted with deionized water to make a 5% (solids) solution which was acidic (pH 3–4). An identical square of heat-cleaned, unsized fiberglass fabric, as was used in Example 1, was immersed in the solution and subjected to the identical drying treatment as in Example 1. Whiteness measurements of the fabric square treated in accordance with this example were conducted in accordance with the analytical procedures referenced above in Example 1. The results are set forth below in Table 1.

Comparative Example 4

An identical square of heat-cleaned, unsized fiberglass fabric, as was used in Example 1, was immersed in a 5% (solids) solution (pH 5–6) of a commercially available polyethyleneimine polyamide fiberglass lubricant (Emery® 6717L), and subjected to the identical drying treatment as in Example 1. Whiteness measurements of the fabric square treated in accordance with this example were conducted in accordance with the analytical procedures referenced above in Example 1. The results are set forth below in Table 1.

Comparative Example 5

An identical square of untreated, unsized fiberglass fabric, as was used in Example 1, was immersed in a commercially available polyethyleneimine polyamide fiberglass lubricant (Alubraspin® 226), and subjected to the identical drying treatment as in Example 1. Whiteness measurements of the fabric square treated in accordance with this example were conducted in accordance with the qualitative analytical procedures referenced above in Example 1. The results are set forth below in Table 1.

TABLE 1

| Example No. | Lubricant/Derivative Type (if any) | Whiteness [We] (ASTM E313) | Whiteness [W] (CIE Pub. 15.2) | Visual Eval. |
| --- | --- | --- | --- | --- |
| Control | untreated FG fabric | 60.69 | 60.35 | white |
| 1 | urea-derivative | 17.14 | 10.49 | white |
| 2 | ethyl isocyanate-derivative | 27.02 | 29.65 | white |
| 3 | cyanamide-derivative | 10.23 | 5.35 | white |
| Comp. 1 | dimethyl carbonate-derivative | −21.43 | −47.84 | yellow |
| Comp. 2 | acrylonitrile-derivative | −21.8 | −36.08 | yellow |
| Comp. 3 | paraform/formic acid-derivative | −22.14 | −47.02 | yellow |
| Comp. 4 | Emery ® 6717L Lubricant | −11.8 | −28.95 | yellow |
| Comp. 5 | Alubraspin ® 226 Lubricant | n.q.e. | n.q.e. | yellow |

In Table 1, "n.q.e." means not quantitatively evaluated.

As evidenced by the results set forth above in Table 1, fiber lubricants containing polyethyleneimine polyamide derivatives in accordance with the present invention exhibit a significant and unexpected resistance to yellowing. The reduced yellowing upon drying as compared to commercially available lubricants containing polyethyleneimine polyamides is significantly improved. Qualitatively, it has been observed, that little or no significant, visible yellowing occurs on fibers treated with lubricants containing polyethyleneimine polyamide derivatives in accordance with the present invention.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed is:

1. A polymer derivative comprising a polyalkyleneimine backbone having a number of reactive amino functionalities, each reactive amino functionality having at least one reactive hydrogen atom, wherein a color stabilizing-effective amount of the number of reactive amino functionalities have a substituent-compound independently selected from the group consisting of carboxylic acids and amine-protecting compounds substituted in place of the at least one reactive hydrogen atom, and wherein at least about 20% of the reactive amino functionalities have a carboxylic acid substituted in place of the at least one reactive hydrogen atom.

2. The polymer derivative according to claim 1, wherein the polyalkyleneimine backbone comprises a polyethyleneimine having a molecular weight of from about 400 to about 2500.

3. The polymer derivative according to claim 1, wherein the polyalkyleneimine backbone comprises a polyethyleneimine having a molecular weight of from about 1000 to about 1800.

4. The polymer derivative according to claim 1, wherein the carboxylic acids have from about 2 to about 18 carbon atoms.

5. The polymer derivative according to claim 1, wherein the carboxylic acids have from about 2 to about 9 carbon atoms.

6. The polymer derivative according to claim 1, wherein the substituent-compounds selected from the group consisting of carboxylic acids comprise two or more $C_2$–$C_{18}$ carboxylic acids.

7. The polymer derivative according to claim 6, wherein the substituent-compounds selected from the group consisting of carboxylic acids comprise acetic acid and pelargonic acid.

8. The polymer derivative according to claim 1, wherein the amine-protecting compounds are selected from the group consisting of urea, substituted ureas, isocyanates, cyanamides, haloformates, azidoformates, carbonates, dicarbonates, sulfonyl halides, and methylating agents.

9. The polymer derivative according to claim 1, wherein the amine-protecting compounds are selected from the group consisting of urea, substituted ureas, isocyanates, and cyanamides.

10. The polymer derivative according to claim 1, wherein the amine-protecting compounds comprise urea.

11. The polymer derivative according to claim 1, wherein at least about 75% of the number of reactive amino functionalities have a substituent-compound substituted in place of the at least one reactive hydrogen atom.

12. The polymer derivative according to claim 1, wherein at least about 80% of the number of reactive amino functionalities have a substituent-compound substituted in place of the at least one reactive hydrogen atom.

13. The polymer derivative according to claim 1, wherein at least about 90% of the number of reactive amino functionalities have a substituent-compound substituted in place of the at least one reactive hydrogen atom.

14. A polymer derivative comprising a polyethyleneimine backbone having a molecular weight of about 1200 and a number of reactive amino functionalities, each reactive amino functionality having at least one reactive hydrogen atom, wherein at least about 90% of the number of reactive amino functionalities have a substituent-compound independently selected from the group consisting of acetic acid, pelargonic acid and urea substituted in place of the at least one reactive hydrogen atom, and wherein about 30% of the substituent-compounds comprise acetic acid and about 20% of the substituent-compounds comprise pelargonic acid.

15. A polymer derivative prepared by a process comprising reacting a polyalkyleneimine having a number of reactive amino functionalities with a carboxylic acid and an amine-protecting compound, under conditions sufficient to derivatize a color stabilizing-effective amount of the reactive amino functionalities with either the carboxylic acid or the amine-protecting compound, wherein at least about 20% of the reactive amino functionalities are derivatized with the carboxylic acid.

16. A process for preparing a polymer derivative, the process comprising (a) providing a polyalkyleneimine having a number of reactive amino functionalities per mole, (b) reacting the polyalkyleneimine with at least one carboxylic acid and an amine-protecting compound, wherein a total molar amount of the at least one carboxylic acid and the amine-protecting compound is used which is sufficient to derivatize a color stabilizing-effective amount of the number of reactive amino functionalities per mole.

17. The process according to claim 16, wherein the at least one carboxylic acid and the amine-protecting compound are reacted in a molar ratio of from about 2:3 to about 3:2.

18. The process according to claim 16, wherein the at least one carboxylic acid and the amine-protecting compound are reacted with the polyalkyleneimine sequentially.

19. The process according to claim 16, wherein the polyalkyleneimine comprises a polyethyleneimine having a molecular weight of from about 400 to about 2500.

20. The process according to claim 16, wherein the polyalkyleneimine comprises a polyethyleneimine having a molecular weight of from about 1000 to about 1800.

21. The process according to claim 16, wherein the at least one carboxylic acid comprises a carboxylic acid have from about 2 to about 18 carbon atoms.

22. The process according to claim 16, wherein the at least one carboxylic acid comprises a carboxylic acid have from about 2 to about 9 carbon atoms.

23. The process according to claim 16, wherein the at least one carboxylic acid comprises a mixture of two or more carboxylic acids having from about 2 to about 18 carbon atoms.

24. The process according to claim 16, wherein the at least one carboxylic acid comprises a mixture of acetic acid and pelargonic acid.

25. The process according to claim 17, wherein the at least one carboxylic acid comprises a mixture of acetic acid and pelargonic acid.

26. The process according to claim 25, wherein the pelargonic acid and the acetic acid are reacted in a molar ratio of about 2:3.

27. The process according to claim 16, wherein the at least one amine-protecting compound is selected from the group consisting of urea, substituted ureas, isocyanates, cyanamides, haloformates, azidoformates, carbonates, dicarbonates, sulfonyl halides, and methylating agents.

28. The process according to claim 16, wherein the at least one amine-protecting compound is selected from the group consisting of urea, substituted ureas, isocyanates, and cyanamides.

29. The process according to claim 16, wherein the at least one amine-protecting compound comprises urea.

30. The process according to claim 16, wherein a total molar amount of the at least one carboxylic acid and the amine-protecting compound is used which is sufficient to derivatize at least about 75% of the number of reactive amino functionalities per mole.

31. The process according to claim 16, wherein a total molar amount of the at least one carboxylic acid and the amine-protecting compound is used which is sufficient to derivatize at least about 80% of the number of reactive amino functionalities per mole.

32. The process according to claim 16, wherein a total molar amount of the at least one carboxylic acid and the amine-protecting compound is used which is sufficient to derivatize at least about 90% of the number of reactive amino functionalities per mole.

33. A process for preparing a polymer derivative, the process comprising (a) providing a polyethyleneimine having a molecular weight of about 1200 and a number of reactive amino functionalities per mole, (b) reacting the polyethyleneimine with acetic acid, pelargonic acid and urea, wherein a total molar amount of the acetic acid, pelargonic acid and urea is used which is sufficient to derivatize at least about 90% of the number of reactive amino functionalities per mole.

34. A polymer derivative prepared by the process according to claim 16.

35. A polymer derivative prepared by the process according to claim 33.

36. A fiber lubricant composition comprising a polymer derivative according to claim 1.

37. A fiber lubricant composition comprising a polymer derivative according to claim 14.

38. A fiber lubricant composition comprising a polymer derivative according to claim 15.

39. A fiber lubricant composition comprising a polymer derivative according to claim 34.

40. A fiber lubricant composition comprising a polymer derivative according to claim 35.

41. A method of lubricating a fiber material comprising providing a fiber material and contacting the fiber material with a polymer derivative according to claim 1.

42. A method of lubricating a fiber material comprising providing a fiber material and contacting the fiber material with a polymer derivative prepared by the process according to claim 16.

* * * * *